US010172107B2

(12) United States Patent
Yang et al.

(10) Patent No.: US 10,172,107 B2
(45) Date of Patent: Jan. 1, 2019

(54) METHOD OF TRANSMITTING SLSS BY V2V TERMINAL

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 15/467,347

(22) Filed: Mar. 23, 2017

(65) Prior Publication Data

US 2017/0289940 A1    Oct. 5, 2017

Related U.S. Application Data

(60) Provisional application No. 62/315,024, filed on Mar. 30, 2016.

(51) Int. Cl.

| *H04W 56/00* | (2009.01) |
| *H04W 72/04* | (2009.01) |
| *H04W 24/08* | (2009.01) |
| *H04W 4/70* | (2018.01) |
| *H04W 76/27* | (2018.01) |
| *H04W 76/28* | (2018.01) |
| *G08C 17/00* | (2006.01) |

(52) U.S. Cl.
CPC ......... *H04W 56/0015* (2013.01); *H04W 4/70* (2018.02); *H04W 24/08* (2013.01); *H04W 76/27* (2018.02); *H04W 76/28* (2018.02)

(58) Field of Classification Search
CPC ............ H04W 56/0015; H04W 4/005; H04W 76/046; H04W 76/048; H04W 24/08; H04W 72/0406; H04W 4/70; H04W 76/27; H04W 76/28
USPC ........................................................ 370/311
See application file for complete search history.

(56) References Cited

U.S. PATENT DOCUMENTS

| 2013/0225169 A1* | 8/2013 | Farnsworth ........... H04W 60/04 455/436 |
| 2013/0242774 A1* | 9/2013 | Wang .................... H04W 36/30 370/252 |

(Continued)

*Primary Examiner* — Faisal Choudhury
(74) *Attorney, Agent, or Firm* — Birch, Stewart, Kolasch & Birch, LLP

(57) ABSTRACT

The disclosure of the present invention proposes a method for transmitting a sidelink synchronization signal (SLSS). The method may be performed by a vehicle-to-vehicle (V2V) terminal and comprise: performing measurements during a predetermined evaluation time; determining whether values resulting from performing the measurements are below a threshold value; and if the values resulting from performing the measurements during the predetermined evaluation time are below the threshold value, transmitting the SLSS to a neighboring V2V terminal. If the V2V terminal is in radio resource control (RRC) idle state and if the V2V terminal is configured to use 1.28 s or 2.56 s of a discontinuous reception (DRX) cycle length, the V2V terminal may calculate the predetermined evaluation time by using the number of DRX cycles which is not greater than 3.

12 Claims, 13 Drawing Sheets

(56) References Cited

U.S. PATENT DOCUMENTS

| | | | |
|---|---|---|---|
| 2014/0148171 A1* | 5/2014 | Cucala Garcia .. | H04W 36/0083 455/437 |
| 2016/0044740 A1* | 2/2016 | Siomina .............. | H04W 76/048 455/552.1 |
| 2016/0073306 A1* | 3/2016 | Yang ................. | H04W 36/0088 370/331 |
| 2016/0174175 A1* | 6/2016 | Adachi ................ | H04W 76/10 370/350 |
| 2018/0049259 A1* | 2/2018 | Aminaka ............ | H04W 76/023 |
| 2018/0070264 A1* | 3/2018 | Saiwai ................. | H04W 72/04 |

* cited by examiner

METHOD OF TRANSMITTING SLSS BY V2V TERMINAL

CROSS-REFERENCE TO RELATED APPLICATIONS

Pursuant to 35 U.S.C. § 119 (e), this application claims the benefit of U.S. Provisional Application No. 62/315,024, filed on Mar. 30, 2016, the contents of which are all hereby incorporated by reference herein in their entirety.

FIELD OF THE INVENTION

The present invention relates to mobile communication.

RELATED ART

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

In LTE/LTE-A, a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, due to an increase in user requirements for SNS (Social Network Service), communication among terminals physically close to each other, that is, D2D (Device to Device) communication is required.

D2D communication may be performed among terminals located in coverage of the base station, or among terminals located out of coverage of the base station. Further, D2D communication may be performed between a terminal located out of coverage of the base station and a terminal located in coverage of the base station.

The above-mentioned contents on D2D may also be applied to vehicle-to-everything (V2X). The V2X collectively refers to communication technology through all interfaces with vehicles. The V2X implementations may be, for example, vehicle-to-vehicle (V2V), vehicle-to-infrastructure (V2I), vehicle-to-person (V2P), vehicle-to-network (V2N), or the like.

The V2X terminal may move faster than the D2D terminal. Therefore, there is a problem in applying the above-described contents on D2D directly to the V2X.

SUMMARY OF THE INVENTION

Accordingly, an object of the present invention is to solve the above-mentioned problems.

To achieve the foregoing purposes, the disclosure of the present invention proposes a method for transmitting a sidelink synchronization signal (SLSS). The method may be performed by a vehicle-to-vehicle (V2V) terminal and comprise: performing measurements during a predetermined evaluation time; determining whether values resulting from performing the measurements are below a threshold value; and if the values resulting from performing the measurements during the predetermined evaluation time are below the threshold value, transmitting the SLSS to a neighboring V2V terminal. If the V2V terminal is in radio resource control (RRC) idle state and if the V2V terminal is configured to use 1.28 s or 2.56 s of a discontinuous reception (DRX) cycle length, the V2V terminal may calculate the predetermined evaluation time by using the number of DRX cycles which is not greater than 3.

If the V2V terminal is in the RRC idle state and if 1.28 s of the DRX cycle length is used, the V2V terminal may calculate the predetermined evaluation time by using three (3) DRX cycles.

If the V2V terminal is in the RRC idle state and if 2.56 s of the DRX cycle length is used, the V2V terminal may calculate the predetermined evaluation time by using two (2) DRX cycles.

If the V2V terminal is in the RRC idle state, the V2V terminal may be configured to use 0.32 s or 0.64 s of the DRX cycle length and the V2V terminal calculates the predetermined evaluation time by using six (6) DRX cycles.

If the V2V terminal is in a RRC connected state, the V2V terminal may be configured to use a DRX cycle length which is equal to or less than 0.8 s.

If the V2V terminal is in a RRC connected state and if the V2V terminal is configured to use the DRX cycle length satisfying $0.04\ s<$ the DRX cycle length $<=1.28\ s$, the V2V terminal may calculate the predetermined evaluation time by using three (3) DRX cycles.

If the V2V terminal is in the RRC connected state and if the V2V terminal is configured to use the DRX cycle length satisfying $1.28\ s<$ the DRX cycle length $<=2.56\ s$, the V2V terminal may calculate the predetermined evaluation time by using two (2) DRX cycles.

To achieve the foregoing purposes, the disclosure of the present invention proposes a vehicle-to-vehicle (V2V) terminal for transmitting a sidelink synchronization signal (SLSS). The V2V terminal may comprise: a transceiver; and a processor operatively to the transceiver and configured to: perform measurements during a predetermined evaluation time; determine whether values resulting from performing the measurements are below a threshold value; and if the values resulting from performing the measurements during the predetermined evaluation time are below the threshold value, transmit the SLSS to a neighboring V2V terminal. If the V2V terminal is in radio resource control (RRC) idle state and if the V2V terminal is configured to use 1.28 s or 2.56 s of a discontinuous reception (DRX) cycle length, the V2V terminal may calculate the predetermined evaluation time by using the number of DRX cycles which is not greater than 3.

According to the disclosure of the present invention, the problem of the conventional technology described above may be solved.

DESCRIPTION OF EXEMPLARY EMBODIMENTS

Figure 1:
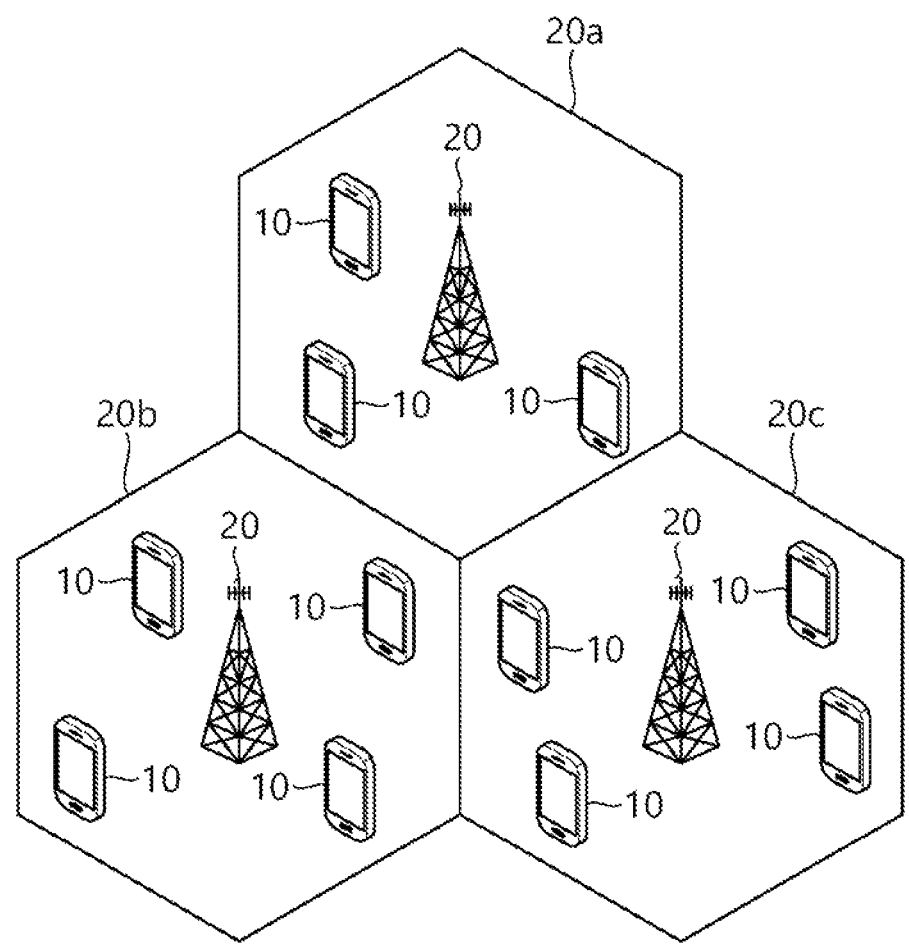
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
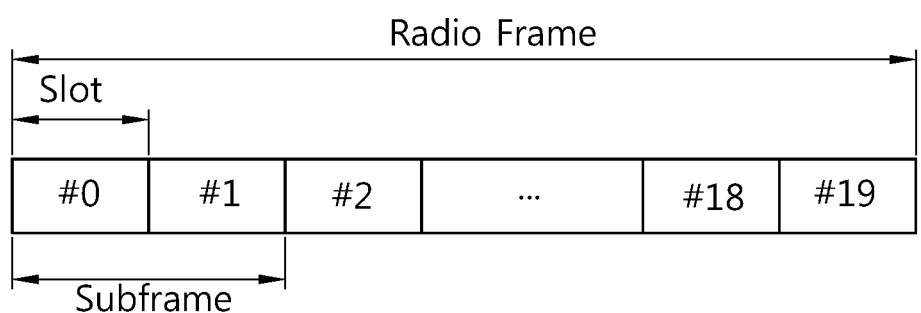
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
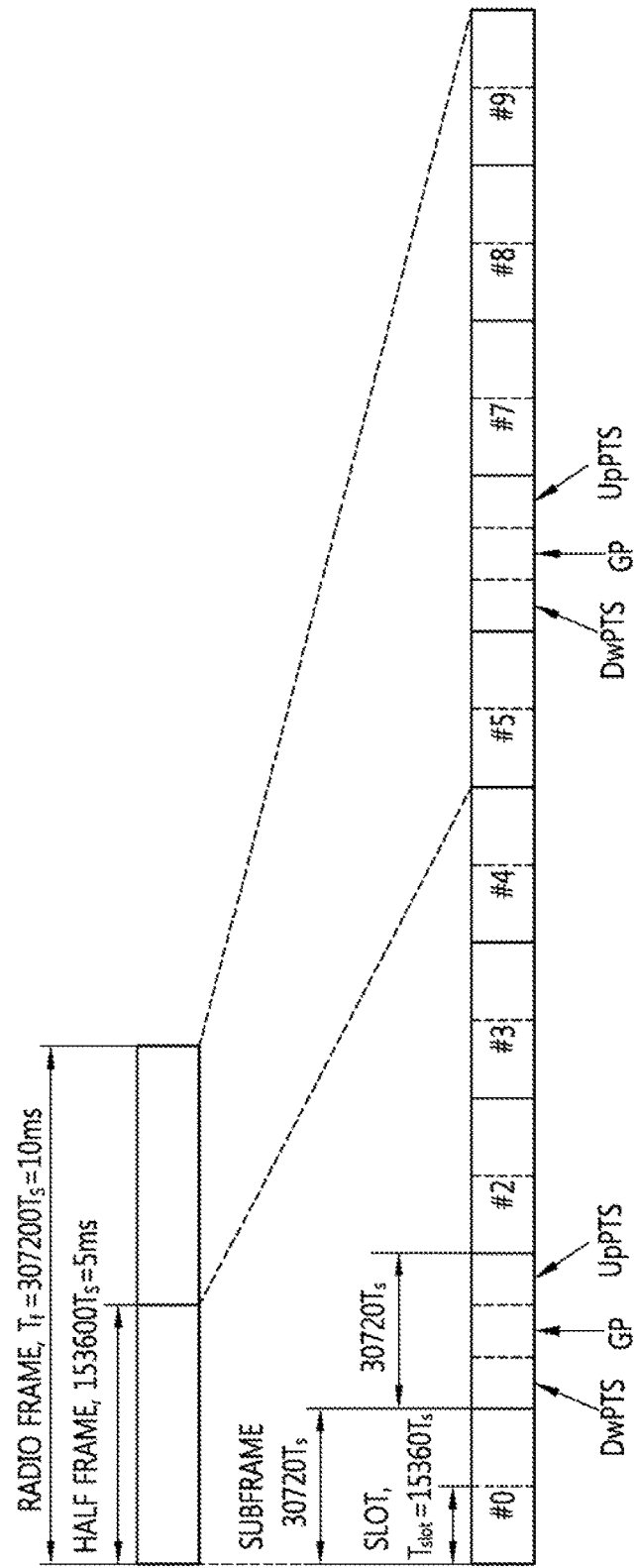
FIG. 3 illustrates a structure of a downlink radio frame according to TDD in the 3GPP LTE.

FIG. 3 illustrates the architecture of a downlink radio frame according to TD D in 3GPP LTE.

Sub-frames having index #1 and index #6 are denoted special sub-frames, and include a DwPTS(Downlink Pilot Time Slot: DwPTS), a GP(Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
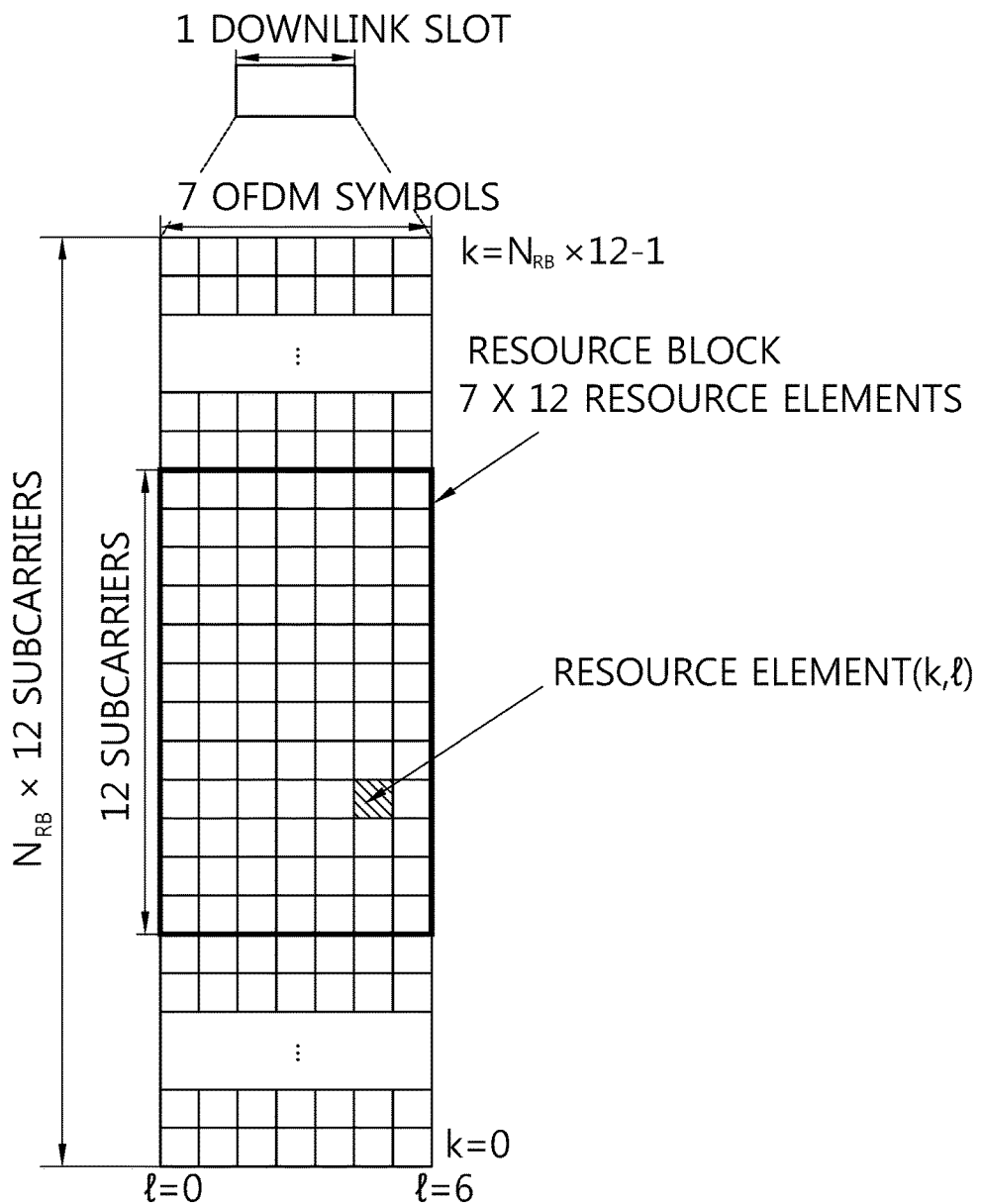
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
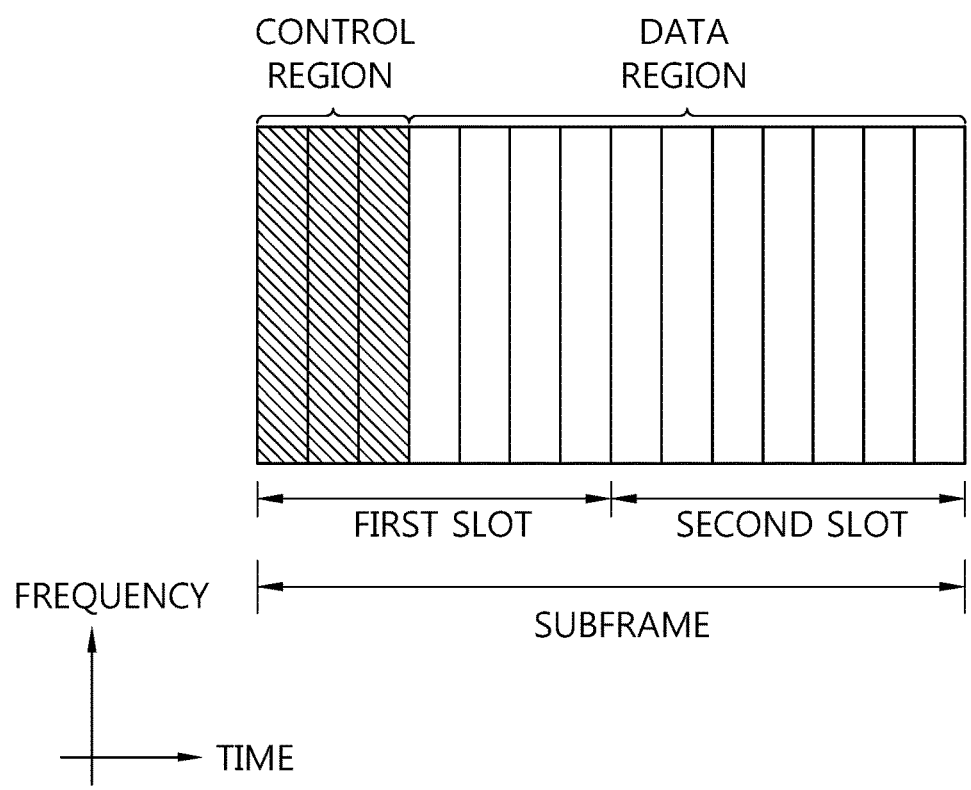
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
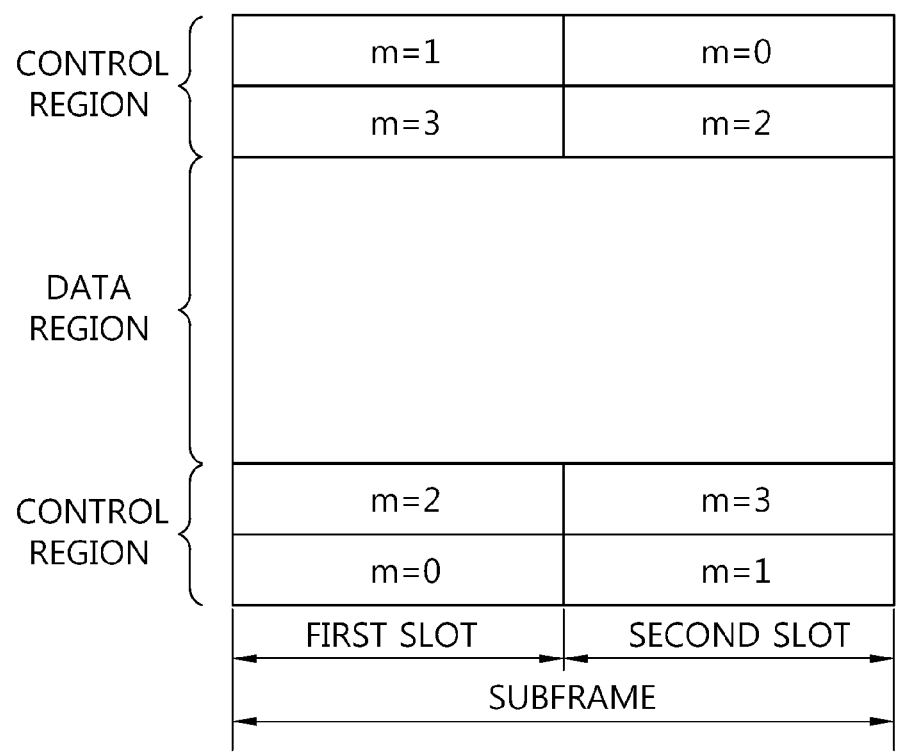
FIG. 6 illustrates the architecture of an uplink sub-frame in 3GPP LTE.
Figure 6:
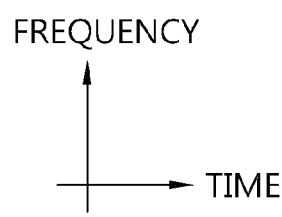

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<Discontinuous Reception (DRX)>

Now, DRX will be described.

The discontinuous reception (DRX) is a technique that allows the terminal to discontinuously monitor the downlink channel to reduce battery consumption. When the DRX is set, the terminal discontinuously monitors the downlink channel. If not, the terminal continuously monitors the downlink channel.

In recent years, a lot of applications require an always-on characteristic. Always-on represents a characteristic that the terminal always accesses the network, and as a result, the terminal may immediately transmit data as necessary.

However, when the terminal continuously maintains the network access, the battery consumption is heavy, and as a result, setting the DRX appropriate to the corresponding application may guarantee the always-on characteristic while reducing the battery consumption.

The DRX cycle specifies periodic repetition of on-duration in which an available period of inactivity is continued. The DRX cycle includes an on-period and an off-period. The on-period is a period in which the terminal monitors the PDCCH within the DRX cycle.

When the DRX is set, the terminal may monitor the PDCCH only during the on-period and not monitor the PDCCH during the off-period.

<D2D(Device to Device) Communication>

On the other hand, the D2D communication expected to be introduced in the next generation communication system will be described below.

Figure 7:
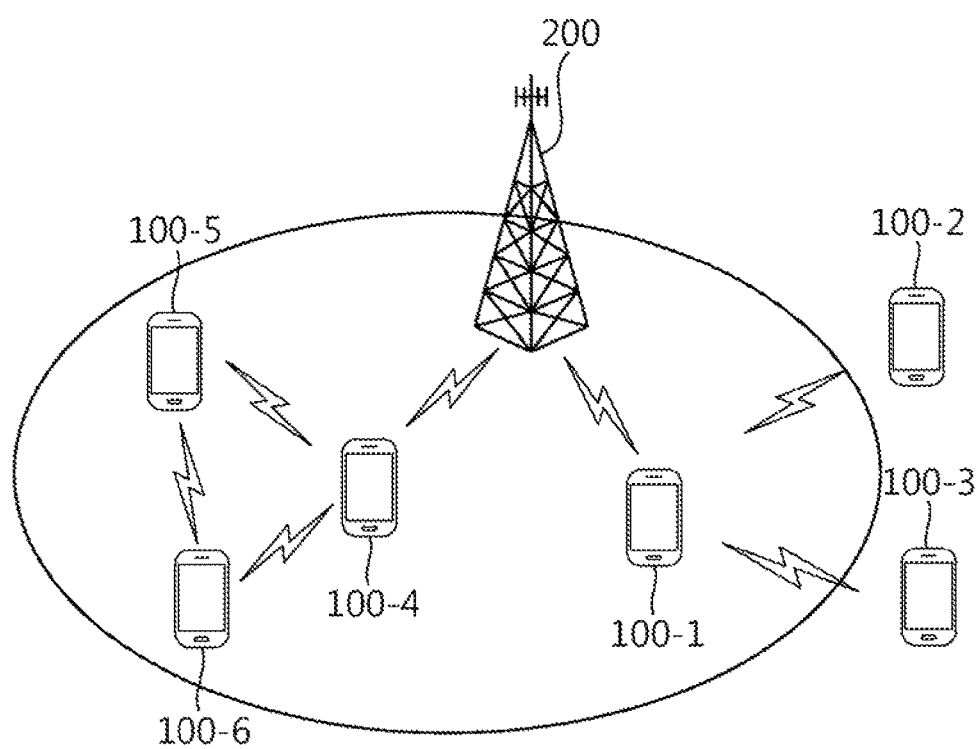
FIG. 7 illustrates the concept of D2D (Device to Device) communication expected to be introduced in the next generation communication system.

FIG. 7 illustrates the concept of D2D (Device to Device) communication expected to be introduced in the next generation communication system.

Due to the increase in user requirements for SNS (Social Network Service), communication between UEs physically close to each other, that is, D2D (Device to Device) communication has been required.

Figure 8:
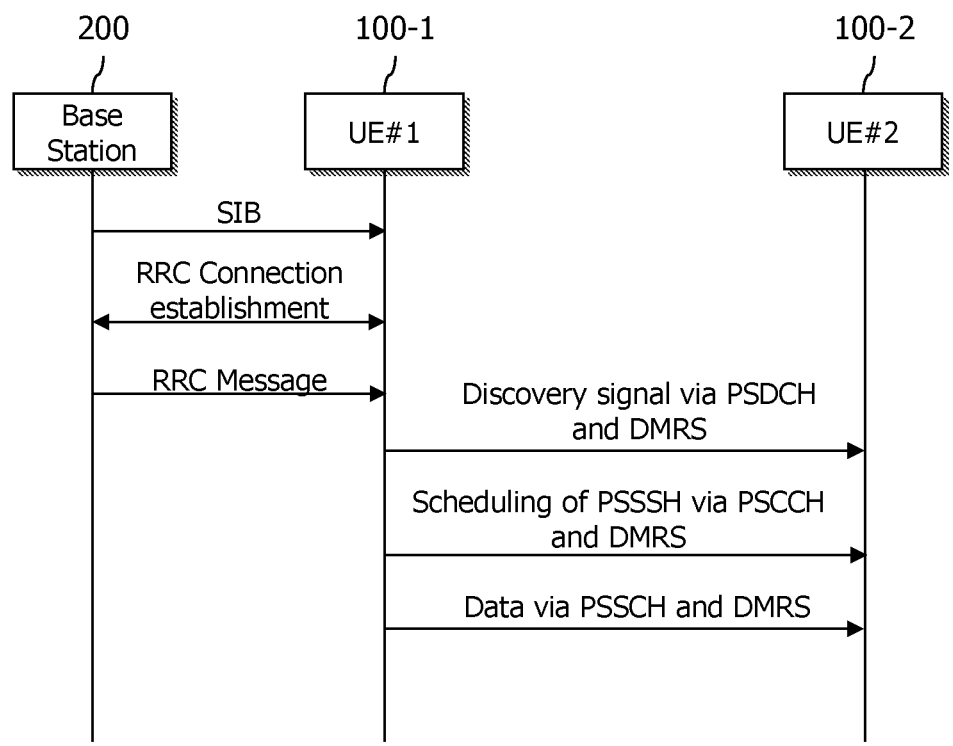
FIG. 8 illustrates an example of D2D communication or ProSe communication between UE #1 and UE #2 illustrated in FIG. 7.

In order to reflect the above-described requirements, as illustrated in FIG. 8, it has been discussed that a method which is capable of directly communicating without intervention of the base station (eNodeB) 200, among UE #1 100-1, UE #2 100-2, and UE #3 100-3, or UE #4 100-4 UE #5 100-5, and UE #6 100-6. Of course, with the help of the base station (eNodeB) 200, it is possible to directly communicate between the UE #1 100-1 and the UE #4 100-4. Meanwhile, the UE #4 (100-4) may serve as a repeater for the UE #5 (100-5) and the UE #6 (100-6). Likewise, the UE #1 100-1 may serve as a repeater for UE #2 (100-2) and UE #3 (100-3) far from the cell center.

Meanwhile, D2D communication is also called Proximity Service (ProSe). The UE performing the proximity service is also referred to as a ProSe UE. Further, a link among UEs used in the D2D communication is also referred to as a side link. A frequency band that may be used for the side link is as follows.

TABLE 3

| Side link band | E-UTRA band | Transmission $F_{UL\_low}$-$F_{UL\_high}$ | Reception $F_{DL\_low}$-$F_{DL\_high}$ | Duex mode |
|---|---|---|---|---|
| 2 | 2 | 1850 MHz-1910 MHz | 1850 MHz-1910 MHz | HD |
| 3 | 3 | 1710 MHz-1785 MHz | 1710 MHz-1785 MHz | HD |
| 4 | 4 | 1710 MHz-1755 MHz | 1710 MHz-1755 MHz | HD |
| 7 | 7 | 2500 MHz-2570 MHz | 2500 MHz-2570 MHz | HD |
| 14 | 14 | 788 MHz-798 MHz | 788 MHz-798 MHz | HD |
| 20 | 20 | 832 MHz-862 MHz | 832 MHz-862 MHz | HD |
| 26 | 26 | 814 MHz-849 MHz | 814 MHz-849 MHz | HD |
| 28 | 28 | 703 MHz-748 MHz | 703 MHz-748 MHz | HD |
| 31 | 31 | 452.5 MHz-457.5 MHz | 452.5 MHz-457.5 MHz | HD |
| 41 | 41 | 2496 MHz-2690 MHz | 2496 MHz-2690 MHz | HD |

Physical channels used for the sidelink are as follows.
PSSCH (Physical Sidelink Shared Channel)
PSCCH (Physical Sidelink Control Channel)
PSDCH (Physical Sidelink Discovery Channel)
PSBCH (Physical Sidelink Broadcast Channel)
Further, physical signals used in the side link are as follows.
DMRS (Demodulation Reference signal)
SLSS (Sidelink Synchronization signal)
The SLSS includes a PSLSS (primary sidelink synchronization signal) and a SSLSS (secondary sidelink synchronization signal).

FIG. 8 illustrates an example of D2D communication or ProSe communication between UE #1 and UE #2 illustrated in FIG. 7.

Referring to FIG. 8, the BS 200 broadcasts a System Information Block (SIB) in a cell.

The SIB may include information on resource pools related to D2D communication. Information on the resource pool related to the D2D communication may be divided into SIB type 18 and SIB type 19.

The SIB type 18 may include resource configuration information for D2D communication. Further, the SIB type 19 may include resource setting information related to a D2D discovery.

The SIB type 19 includes the discSyncConfig as shown below.

TABLE 4

| SIB Type 19 |
|---|
| discSyncConfig | Indicates a configuration as to whether the UE is allowed to receive or transmit synchronization information. The base station (E-UTRAN) can set discSyncConfig when the UE intends to transmit synchronization information using dedicated signaling when it intends to use the dedicated signaling to allow |

The discSyncConfig includes SL-SyncConfig. The SL-SyncConfig includes configuration information for SLSS reception and SLSS transmission as shown in the following table.

TABLE 5

| SL-SyncConfig field description |
|---|
| discSyncWindow | Also called a searching window. Indicates a synchronization window in which the UE expects the SLSS. The value can be set to w1 or w2. The value w1 represents 5 milliseconds, and the value w2 corresponds to the length of the normal CP divided by 2. |
| syncTxPeriodic | Indicates whether the UE transmits the SLSS once or periodically (e.g. every 40 ms) within each period of a discovery signal transmitted by the UE. For the periodic transmissions, the UE also transmits a MasterInformationBlock-SL. |
| syncTxThreshIC | Represents a threshold used when in coverage. If the RSRP value measured for the counterpart UE (recognized as a cell) selected for sidelink communication is lower than the threshold value, the UE may transmit the SLSS for the sidelink communication with the counterpart UE. |
| txParameters | Includes a parameter for a configuration for transmission. |

Meanwhile, the UE #1 100-1 located within the coverage of the base station 200 establishes an RRC connection with the base station.

Further, the UE #1 100-1 receives an RRC message, e.g., an RRC Connection Reconfiguration message from the BS 200. The RRC message includes a discovery configuration (hereinafter referred to as a discConfig). The discConfig includes configuration information for a discover resource pool (hereinafter referred to as a DiscResourcePool) for discovery. The DiscResourcePool includes information as shown in the following table.

TABLE 6

| | DiscResourcePool |
|---|---|
| discPeriod | May be noted as a discovery period, and is also called a PSDCH period, as a period of resources allocated in a cell for transmission/reception of a discovery message. The values may be rf32, rf64, rf128, rf256, rf512, rf1024, or the like. These values represent the number of radio frames. That is, when the value is rf32, it represents 32 radio frames. |
| numRepetition | Indicates the number of times that the subframe Bitmap is repeated for mapping to the subframe occurred in the discPeriod. The base station configures numRepetition and subframeBitmap so that the mapped subframe ca not exceed the discPeriod. |
| TF-ResourceConfig | Assigns a set of time/frequency resource used in the sidelink communication. |

The TF-ResourceConfig includes information as shown in the following table.

TABLE 7

```
SL-TF-ResourceConfig-r12 ::=   SEQUENCE {
    prb-Num-r12                  INTEGER (1..100),
    prb-Start-r12                INTEGER (0..99),
    prb-End-r12                  INTEGER (0..99),
    offsetIndicator-r12          SL-OffsetIndicator-r12,
    subframeBitmap-r12           SubframeBitmapSL-r12
}
```

The SubframeBitmapSL is as in the following table.

TABLE 8

| SubframeBitmapSL | May be noted as discoverySubframeBitmap, and assingns a subframe bitmap indicating the resources used for the side link. The value may be designated as bs4, bs8, bs12, bs16, bs30, bs40, bs40, or the like. For example, the bs40 refers to a bit string length of 40. |
|---|---|

The SL-OffsetIndicator includes information as shown in the following table.

TABLE 9

| SL-OffsetIndicator | May be noted as discoveryOffsetIndicator, and indicates an offset in a first period of the resource pool within the SFN cycle. |
|---|---|
| SL-OffsetIndicatorSync | May be noted as SyncOffsetIndicator, indicates the relationship between subframes and SFNs containing synchronous resources based on an equation (SFN * 10 + Subframe Number) mod 40 = SL-OffsetIndicatorSync. |

Meanwhile, the UE #1 100-1 may transmit a discovery signal through the PSDCH in order for the UE #1 to detect whether there is a suitable UE in the vicinity thereof for D2D communication or ProSe communication, or inform its presence.

Also, the UE #1 100-1 may transmit a scheduling assignment (SA) through the PSCCH. The UE #1 100-1 may transmit a PSSCH including data based on the scheduling assignment (SA).

Figure 9:
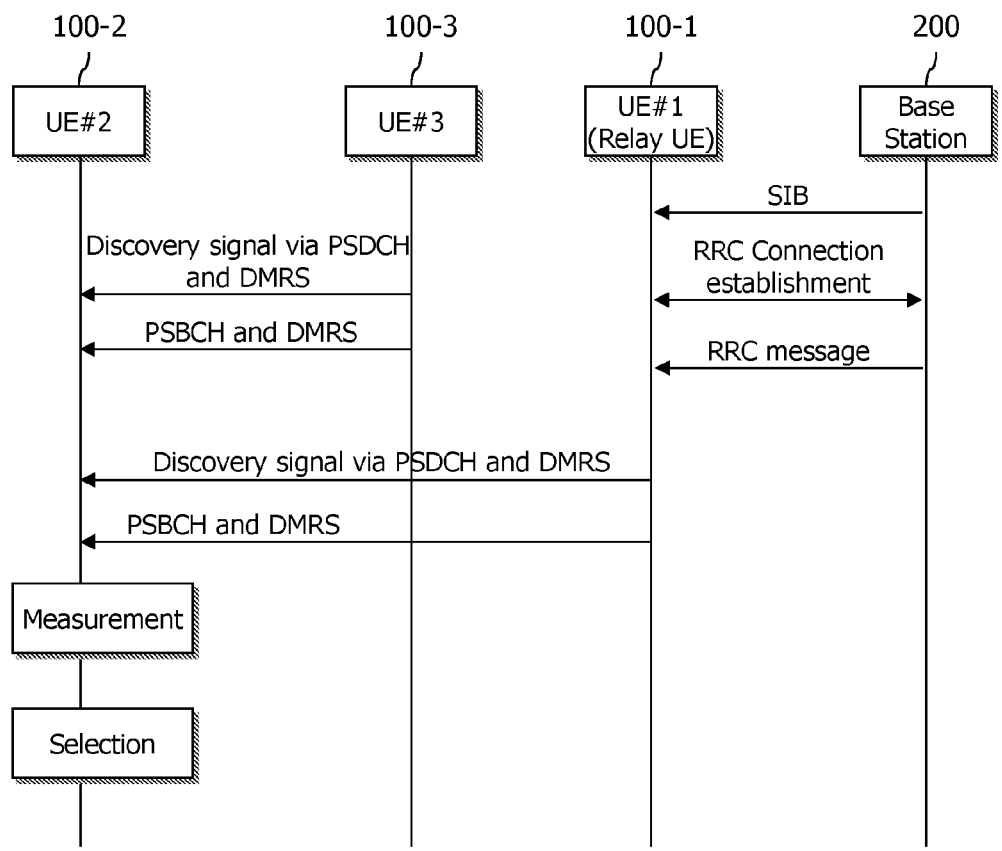
FIG. 9 illustrates an example in which UE #2 shown in FIG. 7 selects a Relay UE.

FIG. 9 illustrates an example in which UE #2 shown in FIG. 7 selects a Relay UE.

Referring to FIG. 9 along with FIG. 7, the UE #2 100-2 located outside the coverage of the base station receives the discovery signal from neighboring UEs and a DMRS for demodulation of the discovery signal, in order to communicate with the UE #1 100-1 which is located within the coverage of the base station and thus operates as the Relay UE. Also, the UE #2 100-2 receives a PSBCH from the neighboring UEs and a DMRS for demodulating the PSBCH.

Then, the UE #2 100-2 performs a measurement based on the received signals.

The measurement includes a measurement of S-RSRP (Sidelink Reference Signal Received Power) and a measurement of SD-RSRP (Sidelink Discovery Reference Signal Received Power).

Here, the S-RSRP means an average received power on an RE (Resource Element) including a DMRS for demodulating a PSBCH received in the middle six PBBs. In this case, the power per RE is determined from the energy received on the portion excluding the CP portion in the OFDM symbol.

The SD-RSRP means the average reception power on the RE including the DMRS for demodulating the PSDCH, when the CRC check is successful in accordance with successful decoding of the PSDCH including the discovery signal.

Upon completion of the measurement, the UE #2 100-2 selects the UE #1 100-1 capable of operating as the Relay UE based on the measurement result, that is, the measurement result of the SD-RSRP.

Figure 10:
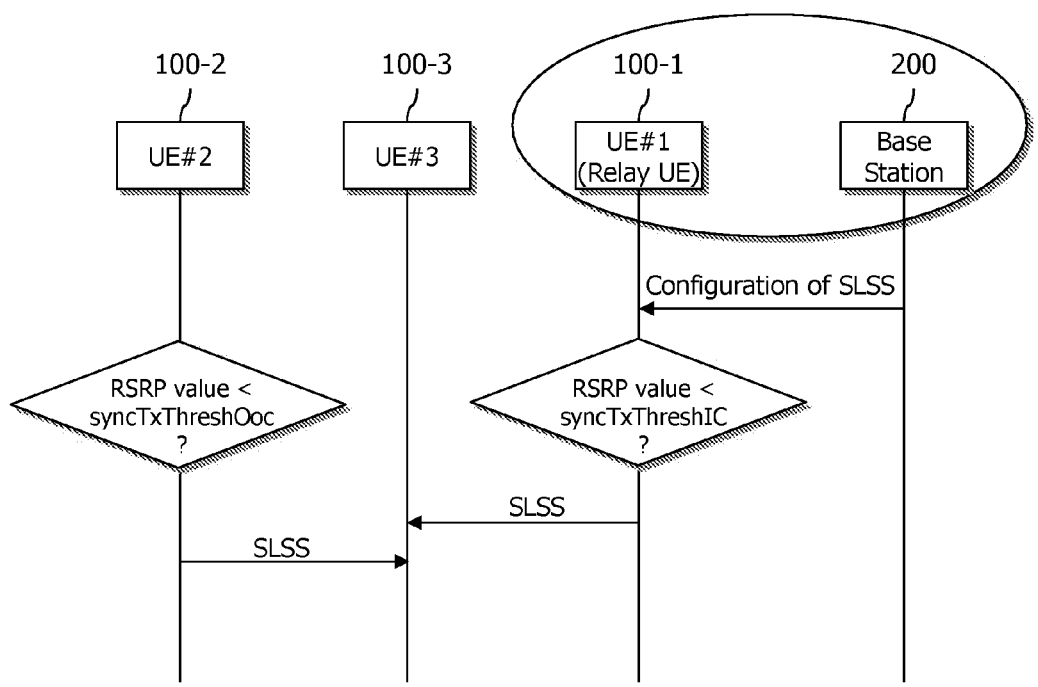
FIG. 10 illustrates an example of transmitting the SLSS.

FIG. 10 illustrates an example of transmitting the SLSS.

Referring to FIG. 10, UE #1 100-1 located in coverage (IC) of the base station receives SLSS configuration information (e.g., SL-SyncConfig shown in Table 5). The SLSS configuration information may include a first threshold value, e.g., syncTxThreshIC, for determining whether or not to transmit the SLSS in coverage (IC), as shown in Table 5.

The UE #1 (100-1) located in coverage (IC) performs the RSRP measurement during the first threshold (e.g., syncTxThreshIC). Then, the UE #1 100-1 determines whether the measured value of the RSRP is lower than the first threshold value (e.g., syncTxThreshIC). If the measured value of the RSRP is smaller than the first threshold value (e.g., syncTxThreshIC) during a predetermined evaluation time (e.g., $T_{evaluate,SLSS}$), the UE #1 100-1 transmits SLSS.

Meanwhile, the illustrated UE #2 100-2 and UE #3 100-3 are currently out of coverage (OoC). The UE #2 100-2 and the UE #3 100-3 is storing predetermined information, e.g., SL-Preconfiguration. The SL-Preconfiguration may include a synchronization signal, i.e., SL-PreconfigSync, which is previously configured on the SLSS transmission. More specifically, the SL-PreconfigSync may include a second threshold value, e.g., syncTxThreshOoC, for determining whether the SLSS is transmitted from out of coverage (OoC) area.

The UE #2 100-2 located out of coverage (OoC) performs RSRP measurement during a predetermined evaluation time (e.g., $T_{evaluate,SLSS}$). Then, the UE #2 100-2 determines whether the measured value of the RSRP is lower than the second threshold value (e.g., syncTxThreshOoC). If the measured value of the RSRP is smaller than the second threshold value (e.g., syncTxThreshOoC) during the predetermined evaluation time (e.g., $T_{evaluate,SLSS}$), the UE #2 100-2 transmits SLSS.

<V2X(Vehicle-to-Everythihg)>

The above-mentioned D2D may also be applied to vehicle-to-everything (V2X). The V2X collectively refers to communication technology through all interfaces with vehicles. The implementation of V2X may be as follows.

First, in the V2X, 'X' may be a vehicle (VEHICLE). In this case, the V2X may be referred to as vehicle-to-vehicle (V2V), which may mean communication between vehicles.

Figure 11:
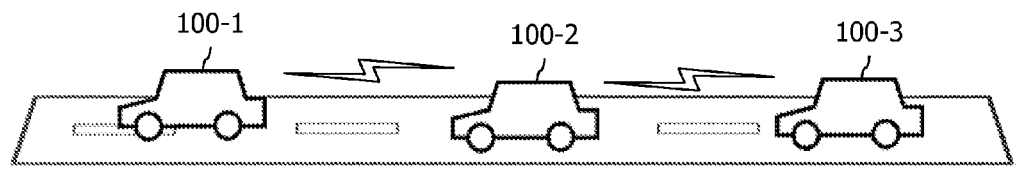
FIG. 11 is an exemplary diagram of illustrating a concept of V2X.

FIG. 11 is an exemplary diagram of illustrating a concept of V2X.

As may be seen with reference to FIG. 10, the vehicles (i.e., wireless devices mounted on the vehicle) 100-1, 100-2, and 100-3 can communicate with each other.

Meanwhile, in V2X, 'X' can mean a person (Person) or a pedestrian (PEDESTRIAN). In this case, V2X may be represented as vehicle-to-person or vehicle-to-pedestrian (V2P). Here, the pedestrian is not necessarily limited to a person walking on a pedestrian, and may include a person riding a bicycle, a driver or a passenger of a vehicle (with a speed lower than a certain speed).

Or 'X' may be an infrastructure (Infrastructure)/network (Network). In this case, the V2X may be referred to as vehicle-to-infrastructure (V2I) or vehicle-to-network (V2N) and may refer to the communication between the vehicle and the ROADSIDE UNIT (RSU) or between the vehicle and the network. The roadside apparatus may be a transportation-related infrastructure, e.g., an apparatus for indicating speed. The roadside apparatus may be implemented in a base station or a fixed terminal.

Meanwhile, the V2X terminal may move at a high speed than the D2D terminal. Therefore, there is a problem in applying the above-described D2D contents directly to V2X. More specifically, since the predetermined evaluation time (e.g., $T_{evaluate,SLSS}$) related to the comparison of the measured value of the RSRP with the first or second threshold value has been established in consideration of the conventional low-speed movement, it is difficult to apply it to the V2X terminal moving at a high speed.

<Disclosure of the Present Description>

Accordingly, the disclosure of the present description proposes methods to solve the above-mentioned problems.

For the predetermined time (e.g., $T_{evaluate,SLSS}$) described above, it has been conventionally divided into as the cases that the UE is in the RRC Connected state in coverage (IC), the UE is in the RRC idle state in coverage (IC), an the UE is located out of coverage (OoC) area.

First, when the UE is in the RRC Connected state in the IC (Coverage), the $T_{evaluate,SLSS}$ have been determined as shown in the following table.

TABLE 10

| DRX cycle length [s] | $T_{evaluate,SLSS}$ [s] (number of DRX cycles) |
|---|---|
| 0.32 | 1.92 (6) |
| 0.64 | 3.84 (6) |
| 1.28 | 7.68 (6) |
| 2.56 | 15.36 (6) |

The number in parentheses in the above table means the number of DRX cycles. For example, 1.92 (6) in the first row means 6 DRX cycles in 1.92 seconds. That is, when the $T_{evaluate,SLSS}$ are 1.92 seconds, it means that six times of the DRX cycle of 0.32 length is required for RSRP measurement. In addition, if the $T_{evaluate,SLSS}$ are 15.36 seconds, it means that six times of the DRX cycle of length 2.56 is required for RSRP measurement.

Meanwhile, if the UE is in the RRC idle state in converge (IC), the $T_{evaluate,SLSS}$ are determined as shown in the following table.

TABLE 11

| DRX cycle length [s] | $T_{evaluate,SLSS}$ [s] (number of DRX cycles) |
|---|---|
| ≤0.04 | 0.4 (Note 1) |
| 0.04 < DRX-cycle ≤ 2.56 | Note 2 (6) |

(Note 1): Number of DRX cycles depends upon the DRX cycle in use
Note 2: Time depends upon the DRX cycles in use On the other hand, when the UE is located out of coverage (OoC), the $T_{evaluate,SLSS}$ are determined as follows.

$T_{evaluate,SLSS}$ with ProSe Direct Communication=800 ms

As described above, the $T_{evaluate,SLSS}$ for out of coverage (OoC) have been determined to be 800 ms. Here, it may be considered that a relative speed is 250 km/h. For example, if the V2X terminal A moves at 125 km/h and the V2X terminal B moves at 125 km/h in the opposite direction, the relative speed is 250 km/h. In this case, a relative movement distance is 111 m during 800 ms, which is the evaluation time ($T_{evaluate,SLSS}$). Therefore, there is no problem on using the $T_{evaluate,SLSS}$ for out of coverage as it is.

On the other hand, let's assume that in the RRC connection state, the V2X terminal moves at a speed of 120 km/h. Then, the V2X terminal will move 512 meters for 15.35 seconds. If the V2X terminal moves at a speed of 250 km/h, for calculating a travelling distance, it is as shown in the table

TABLE 12

| DRX cycle length [s] | Tevaluate, SLSS [s] (number of DRX cycles) | Moving distance with 250 km/h [m] |
|---|---|---|
| 0.32 | 1.92 (6) | 133 |
| 0.64 | 3.84 (6) | 267 |
| 1.28 | 7.68 (6) | 533 |
| 2.56 | 15.36 (6) | 1067 |

As shown in the above table, when the V2X terminal moves at a speed of 250 km/h, the V2X terminal moves about 1 km during 15.35 seconds (s). Further, since a serving cell will change while the V2X terminal moves 1 km, it is meaningless to measure the RSRP to determine whether to transmit the SLSS.

Therefore, it is necessary to improve the evaluation time $T_{evaluate,SLSS}$ which has been conventionally determined. Accordingly, the present description proposes as follows.

Proposal 1: Considering a V2X terminal moving at high speed, it is proposed to use only 0.32 s (i.e., 320 ms) and 0.64 s (i.e., 640 ms) for the DRX cycle length for the RSRP evaluation time to determine whether to transmit the SLSS.

Proposal 2: It is proposed to use the existing evaluation time when the DRX cycle length is 0.32 s (i.e., 320 ms) and 0.64 s (i.e., 640 ms), while it is proposed to reduce the number of DRX cycles when the DRX cycle length is 1.28 s or 2.56 s.

The above two proposals may be applied to both the RRC connection state and the RRC idle state.

Specifically, according to proposal 1 in the RRC idle state, the evaluation time $T_{evaluate,SLSS}$ may be determined as follows

TABLE 13

| DRX cycle length [s] | $T_{evaluate,SLSS}$ [s] (number of DRX cycles) |
|---|---|
| 0.32 | 1.92 (6) |
| 0.64 | 3.84 (6) |
| 1.28 | 7.68 (6) |
| 2.56 | 15.36 (6) |

Note 1:
For V2X service, DRX cycle length of 0.32 s and 0.64 s are applied for $T_{evaluate,SLSS}$.

As may be seen in note 1 above, according to proposal 1 in the RRC idle state, only the DRX cycle lengths 0.32 s and 0.64 s may be used to make short the evaluation time $T_{evaluate,SLSS}$.

Alternatively, according to proposal 2 in the RRC idle state, the evaluation time $T_{evaluate,SLSS}$ may be determined as follows.

TABLE 14

| DRX cycle length [s] | $T_{evaluate,SLSS}$ [s] (number of DRX cycles) |
|---|---|
| 0.32 | 1.92 (6) |
| 0.64 | 3.84 (6) |
| 1.28 | 3.84 (3) |
| 2.56 | 5.02 (2) |

As may be seen from the above table, according to proposal 2 in the RRC idle state, if the DRX cycle length is 1.28 s or 2.56 s, the evaluation time $T_{evaluate,SLSS}$ may be made shortened by reducing the number of DRX cycles.

Meanwhile, according to proposal 1 in the RRC connection state, the evaluation time $T_{evaluate,SLSS}$ may be determined as follows

TABLE 15

| DRX cycle length [s] | $T_{evaluate,SLSS}$ [s] (number of DRX cycles) |
|---|---|
| ≤0.04 | 0.4 (Note 1) |
| 0.04 < DRX-cycle ≤ 2.56 | Note 2 (6) |

(Note 1): Number of DRX cycles depends upon the DRX cycle in use
Note 2: Time depends upon the DRX cycles in use
Note 3: For V2X service, DRX cycle length which is equal to and less than 0.8 s is applied for $T_{evaluate,SLSS}$.

As may be seen from note 3 above, according to Proposal 1 in the RRC connection state, only the 0.32 s and 0.64 s of DRX cycle lengths less than 0.8 s may be used to make the evaluation time $T_{evaluate,SLSS}$ shorten.

Meanwhile, according to proposal 2 in the RRC connection state, the evaluation time $T_{evaluate,SLSS}$ may be defined as follows.

TABLE 16

| DRX cycle length [s] | $T_{evaluate,SLSS}$ [s] (number of DRX cycles) |
|---|---|
| ≤0.04 | 0.4 (Note 1) |
| 0.04 < DRX-cycle ≤ 1.28 | Note 2 (3) |
| 1.28 < DRX-cycle ≤ 2.56 | Note 2 (2) |

Note 1: Number of DRX cycles depends upon the DRX cycle in use
Note 2: Time depends upon the DRX cycles in use As may be seen from the above table, according to Proposal 2 in the RRC connection state, if the DRX cycle length is 1.28 s or 2.56 s, the evaluation time $T_{evaluate,SLSS}$ may be made shortened by reducing the number of DRX cycles.

Figure 12:
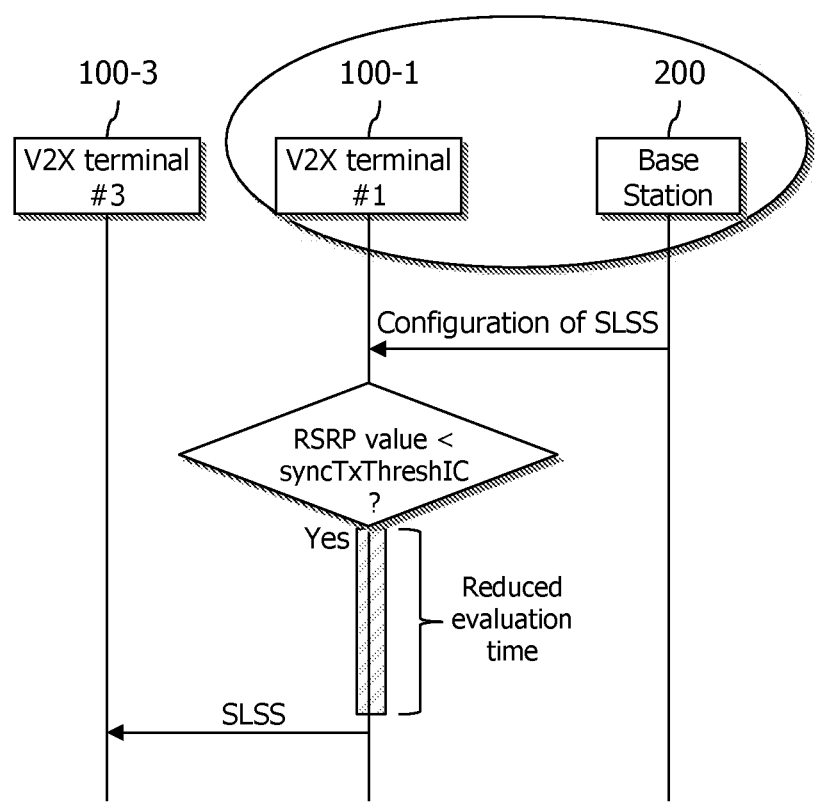
FIG. 12 illustrates an example in which a V2X device transmits the SLSS according to the disclosure of the present description.

FIG. 12 illustrates an example in which a V2X device transmits the SL SS according to the disclosure of the present description.

Referring to FIG. 12, the V2X terminal #1 100-1 located in the coverage (IC) of the base station receives configuration information of the SLSS (e.g., SL-SyncConfig shown in Table 5). The SLSS configuration information may include a first threshold value, e.g., syncTxThreshIC, for determining whether or not to transmit the SLSS in coverage (IC), as shown in Table 5.

The V2X terminal #1 100-1 located in coverage (IC) of the base station performs the RSRP measurement during the reduced evaluation time (e.g., $T_{evaluate,SLSS}$). Further, the V2X terminal #1 100-1 determines whether the measured value of the RSRP is lower than the first threshold value (e.g., syncTxThreshIC). If the measured value of the RSRP is smaller than the first threshold value (e.g., syncTxThreshIC) during the shortened evaluation time (e.g., $T_{evaluate,SLSS}$), the V2X terminal #1 100-1 transmits SLSS.

When the V2X terminal #1 100-1 is in the RRC idle state, the DRX cycle length may be 0.32 s (i.e., 320 ms) and 0.64 s (i.e., 640 ms) to make shorten the evaluation time as the proposal 1, or when the DRX cycle length is 1.28 s or 2.56 s as the proposal 2, the evaluation time may be made shortened by reducing the number of DRX cycles.

When the V2X terminal #2 100-1 is in the RRC connected state, only the 0.32 s (i.e., 320 ms) and 0.64 s (i.e., 640 ms) of the DRX cycle length lees than 0.8 ms may be used to make shorten the evaluation time as the proposal 1, when the DRX cycle length is 1.28 s or 2.56 s as the proposal 2, the evaluation time may be made shortened by reducing the number of DRX cycles.

As described above, the embodiments of the present invention may be implemented by various means. For example, embodiments of the present invention may be implemented by hardware, firmware, software, or a combination thereof. More specifically, it will be described with reference to the drawings.

Figure 13:
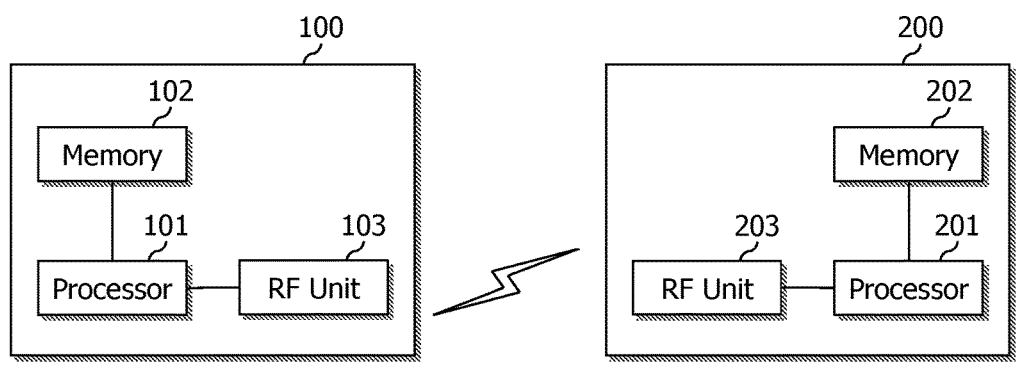
FIG. 13 is a block diagram in which a wireless communication system in which the disclosure of the present description is implemented.

FIG. 13 is a block diagram in which a wireless communication system in which the disclosure of the present description is implemented.

A base station 200 includes a processor 210, a memory 220 and a radio frequency (RF) unit 930. The memory 920 is connected to the processor 210 and stores a variety of information to operate the processor 210. The RF unit 203 connected to the processor 201 to transmit and/or receive a radio signal. The processor 201 implements the proposed functionality, process and/or method. In the above-described embodiment, the operation of the base station may be implemented by the processor 201.

A terminal 100 includes a processor 101, a memory 102, and an RF unit 103. The memory 102 is connected to the processor 101 and stores various information for driving the processor 101. The RF unit 103 is connected to the processor 101 to transmit and/or receive a radio signal. The processor 101 implements the proposed functions, procedures and/or methods.

The processors may include application-specific integrated circuit (ASIC), other chipset, logic circuit and/or data processing device. The memories may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors 810, 910 in which case those can be coupled to the processors 810, via various means as is known in the art.

In the exemplary system described above, although the methods are described on the basis of a flowchart as a series of steps or blocks, the present invention is not limited to the order of the steps, and some steps may occur in different orders or simultaneously with other steps as shown above. It will also be understood by those skilled in the art that the steps shown in the flowchart are not exclusive, and that other steps may be included or that one or more steps in the flowchart may be deleted without affecting the scope of the invention.

What is claimed is:

1. A method for transmitting a sidelink synchronization signal (SLSS), the method performed by a vehicle-to-everything (V2X) terminal and comprising:
    performing measurements during an evaluation time;
    determining whether at least one value resulting from performing the measurements are below a threshold value; and
    if the at least one value resulting from performing the measurements during the evaluation time is below the threshold value, transmitting the SLSS to a neighboring V2X terminal,
    wherein if the V2X terminal is in a radio resource control (RRC) idle state and if the V2X terminal is configured to use 2.56 s of a discontinuous reception (DRX) cycle length, the V2X terminal calculates the evaluation time by using the number of DRX cycles which is not greater than 3, and
    wherein if the V2X terminal is in the RRC idle state and if 1.28 s of the DRX cycle length is used, the V2X terminal calculates the evaluation time by using three (3) DRX cycles.

2. The method of claim 1, wherein if the V2X terminal is in the RRC idle state and if 2.56 s of the DRX cycle length is used, the V2X terminal calculates the evaluation time by using two (2) DRX cycles.

3. The method of claim 1, wherein if the V2X terminal is in the RRC idle state, the V2X terminal is configured to use 0.32 s or 0.64 s of the DRX cycle length and the V2X terminal calculates the evaluation time by using six (6) DRX cycles.

4. The method of claim 1, wherein if the V2X terminal is in a RRC connected state, the V2X terminal is configured to use a DRX cycle length which is equal to or less than 0.8 s.

5. The method of claim 1, wherein if the V2X terminal is in a RRC connected state and if the V2X terminal is configured to use the DRX cycle length satisfying 0.04 s<the DRX cycle length<=1.28 s, the V2X terminal calculates the evaluation time by using three (3) DRX cycles.

6. The method of claim 5, wherein if the V2X terminal is in the RRC connected state and if the V2X terminal is configured to use the DRX cycle length satisfying 1.28 s<the DRX cycle length<=2.56 s, the V2X terminal calculates the evaluation time by using two (2) DRX cycles.

7. A vehicle-to-everything (V2X) terminal for transmitting a sidelink synchronization signal (SLSS), the V2X terminal comprising:
    a transceiver; and
    a processor operatively connected to the transceiver and configured to:
        perform measurements during an evaluation time,
        determine whether at least one value resulting from performing the measurements is below a threshold value, and
        if the at least one value resulting from performing the measurements during the evaluation time is below the threshold value, transmit the SLSS to a neighboring V2X terminal,
    wherein if the V2X terminal is in radio resource control (RRC) idle state and if the V2X terminal is configured to use 2.56 s of a discontinuous reception (DRX) cycle length, the processor calculates the evaluation time by using the number of DRX cycles which is not greater than 3, and
    wherein if the V2X terminal is in the RRC idle state and if 1.28 s of the DRX cycle length is used, the processor calculates the evaluation time by using three (3) DRX cycles.

8. The V2X terminal of claim 7, wherein if the V2X terminal is in the RRC idle state and if 2.56 s of the DRX cycle length is used, the processor calculates the evaluation time by using two (2) DRX cycles.

9. The V2X terminal of claim 7, wherein if the V2X terminal is in the RRC idle state, the V2X terminal is configured to use 0.32 s or 0.64 s of the DRX cycle length and the processor calculate the evaluation time by using six (6) DRX cycles.

10. The V2X terminal of claim 7, wherein if the V2X terminal is in a RRC connected state, the processor is configured to use a DRX cycle length which is equal to or less than 0.8 s.

11. The V2X terminal of claim 7, wherein if the V2X terminal is in a RRC connected state and if the processor is configured to use the DRX cycle length satisfying 0.04 s<the DRX cycle length<=1.28 s, the processor calculates the evaluation time by using three (3) DRX cycles.

12. The V2X terminal of claim 11, wherein if the V2X terminal is in the RRC connected state and if the V2X terminal is configured to use the DRX cycle length satisfying 1.28 s<the DRX cycle length<=2.56 s, the processor calculates the evaluation time by using two (2) DRX cycles.

* * * * *